United States Patent [19]

Fanini et al.

[11] Patent Number: 5,585,727
[45] Date of Patent: Dec. 17, 1996

[54] APPARATUS FOR MEASURING RESISTIVITY OF AN EARTH FORMATION USING DELTA-SIGMA DIGITAL SIGNAL GENERATION AND SIGMA-DELTA DIGITAL DETECTION SYSTEM

[75] Inventors: Otto N. Fanini, Stafford; Antonio Fabris, Houston, both of Tex.

[73] Assignee: Western Atlas International, Inc., Houston, Tex.

[21] Appl. No.: 373,409

[22] Filed: Jan. 17, 1995

[51] Int. Cl.⁶ .................................................. G01V 3/10
[52] U.S. Cl. ........................................... 324/339; 364/422
[58] Field of Search ................................ 324/66, 67, 326, 324/328–372; 364/422; 341/143

[56] References Cited

U.S. PATENT DOCUMENTS

| | | | |
|---|---|---|---|
| 3,328,679 | 6/1967 | Sloughter | 324/339 |
| 4,439,831 | 3/1984 | Sinclair | 324/339 X |
| 4,451,790 | 5/1984 | Bravenec | 324/351 |
| 4,455,529 | 6/1984 | Sinclair | 324/339 |
| 4,481,472 | 11/1984 | Gianzero | 324/339 |
| 4,499,421 | 2/1985 | Sinclair | 324/339 |
| 4,499,422 | 2/1985 | Sinclair | 324/339 |
| 4,720,681 | 1/1988 | Sinclair | 324/339 |
| 5,065,098 | 11/1991 | Salsman et al. | 324/67 X |
| 5,065,099 | 11/1991 | Sinclair et al. | 324/339 |
| 5,083,124 | 1/1992 | Nordstrom | 324/344 X |
| 5,187,661 | 2/1993 | Sinclair | 324/339 X |
| 5,264,795 | 11/1993 | Rider | 324/67 X |
| 5,329,448 | 7/1994 | Rosthal | 324/339 X |
| 5,357,252 | 10/1994 | Ledzius et al. | 341/143 |

OTHER PUBLICATIONS

Western Atlas International, Inc., Introduction to Wireline Log Analysis, p. 59 (copyright 1992) No month.

*Primary Examiner*—Sandra L. O'Shea
*Assistant Examiner*—Jay M. Patidor
*Attorney, Agent, or Firm*—Richard A. Fagin

[57] ABSTRACT

An apparatus for measuring resistivity of an earth formation. The apparatus includes at least one source of measuring current. The source includes a delta-sigma modulator and a serial bit source coupled to the modulator. The serial bit source represents the magnitude of the measuring current at spaced apart time intervals. The apparatus includes a sensor responsive to formation current resulting from interaction of the measure current with the earth formation. The sensor is coupled to a sigma-delta modulator. The modulator is coupled to a digital mixer and a digital filter. The output of the digital filter corresponds to the magnitude of the measure current detected by the sensor sampled at spaced apart time intervals. In a preferred embodiment, the apparatus includes a plurality of current sources each having a different frequency. The sigma-delta modulator is coupled to a plurality of mixers each for demodulating one of the different source frequencies.

21 Claims, 5 Drawing Sheets

_5,585,727_

APPARATUS FOR MEASURING RESISTIVITY OF AN EARTH FORMATION USING DELTA-SIGMA DIGITAL SIGNAL GENERATION AND SIGMA-DELTA DIGITAL DETECTION SYSTEM

BACKGROUND OF THE INVENTION

1. Field of the Invention

The present invention relates to the field of electrical resistivity tools, which are used to measure certain properties of earth formations penetrated by boreholes. More specifically, the present invention relates to a system for digitally processing signals in electrical resistivity tools to improve the accuracy of measurements made by the tools.

2. Discussion of the Relevant Art

Electrical resistivity tools are used to make measurements of electrical resistivity of earth formations penetrated by boreholes. Electrical resistivity measurements can be used for, among other things, estimating content of various types of fluids which can be contained in pore spaces in the earth formations.

Electrical resistivity tools known in the art include galvanic devices. Galvanic devices typically comprise electrodes placed on an insulating exterior surface of the tool. All the electrodes on the tool typically make electrical contact with the earth formation through a conductive fluid which fills the borehole. Some of the electrodes are connected to circuits in the tool which generate electrical current. Other electrodes are connected to different circuits in the tool which measure voltage differences and current flow magnitudes. Measurements of voltage difference and current flow can be related to the electrical resistivity of the earth formations.

A galvanic instrument known in the art is called a dual laterolog tool. The dual laterolog tool comprises electrodes which emit measuring current, and focusing electrodes which emit focusing currents used to constrain, or focus, flow of the measuring current in a predetermined pattern. By focusing the measure current in a predetermined pattern, measurements of resistivity can be related more precisely, for example, to thin vertical sections of the earth formation. Other predetermined patterns for focusing the measuring current can enable measurement of formation resistivity at a radial distance closer to the borehole, which can be useful for estimating movement of fluid from the borehole into the pore space in the formation. A description of the typical electrode arrangement and current focusing patterns of the dual laterolog tool can be found for example in "Introduction to Wireline Log Analysis", by Ed L. Bigelow, Atlas Wireline Services, Houston, Tex., 1992 (p. 59).

The tool described in the Bigelow reference, for example, simultaneously makes two differently focused measurements of resistivity using the same set of electrodes. The simultaneous measurements are performed by using measuring and focusing current systems operating at two different frequencies. Each of the measuring and focusing systems operates at a different one of the two frequencies.

In order for the dual laterolog tool to accurately record the measurements made by each focusing and measuring system, the signals generated and detected by each frequency system must, to the greatest extent possible, be prevented from interfering with each other.

Methods are known in the art for reducing interference between measuring and focusing systems operating at different frequencies. One method known in the art is to provide an analog bandpass filter having a very narrow bandwidth to an input of the voltage and current measuring circuits in the tool corresponding to each measurement system frequency. Analog bandpass filters reject passage of electrical current at frequencies other than within a so-called frequency passband. One of the limitations of analog bandpass filters is that they can pass some current at frequencies other than within the frequency passband. A plurality of measurement systems operating at different frequencies may not be sufficiently isolated from each other by using analog bandpass filters to prevent interference between respective systems.

Another method known in the art for reducing interference between different frequency measurement systems is to provide a current source for each measurement system having as nearly as possible only one frequency component. This type of source is called a monochromatic current source. By providing a substantially monochromatic current source for each measurement system, detections of voltages and currents in a particular measurement system which are not at the frequency of that particular measurement system can be reduced.

A system for providing a substantially monochromatic current source is known in the art and is described, for example, in U.S. Pat. No. 4,499,421 issued to Sinclair. The system described in the Sinclair '421 patent comprises a pair of digital latches and a precision resistor network to generate a stair-step approximation of a sinusoidal waveform. The stair-step approximation output from the resistor network is then conducted to an amplifier having an analog low-pass filter. The analog low-pass filter reduces the magnitude of the "stair-steps" since they have a much higher effective frequency than the sinusoidal signal. In addition to the limitations of analog filters as previously described herein, the system disclosed in the Sinclair '421 patent has a further limitation in that the system in the Sinclair patent uses a precision resistor network to accomplish the digital-to-analog conversion. Some of the limitations of precision resistor networks used in digital-to-analog conversion are described, for example, in U.S. Pat. No. 5,357,252 issued to Ledzius, et al. The Ledzius '252 patent states that the "resistive-divider" technique of data conversion, which includes the digital-to-analog conversion of the signal generator disclosed in the Sinclair '421 patent, can be difficult because the resistive-divider technique requires using high precision analog components which may be difficult to form, particularly in a system intended to be used in the limited space provided inside a resistivity tool used in boreholes. A resistivity tool comprising a plurality of different measurement and focusing systems which operate at different frequencies, using a plurality of signal generators similar to the one disclosed in the Sinclair '421 patent, is impractical.

It is known in the art to provide an analog-to-digital converter responsive to a range of frequencies to reduce signal distortion which can be present in analog signal processing circuits. The Ledzius '252 patent, for example, discloses an analog-to-digital converter responsive to a plurality of frequencies defining a usable range called the bandwidth. The analog-to-digital converter in the '252 patent could be used in a multiple frequency resistivity tool if each measuring circuit for each different frequency could be connected to a converter similar to the converter disclosed in the '252 patent and combined with a narrow bandwidth analog filter. However, a limitation on the use of the converter of the '252 patent in a multiple frequency resistivity tool is the need to include analog components in a filter stage of the converter, as shown at 83 and 84 of FIG.

5 in the '252 patent. The converter disclosed in the '252 patent was intended to have a bandwidth comprising a relatively wide range of frequencies in order to be usefull, for example, in digital telephony. Including the analog components of the '252 patent in the output stage of the converter as disclosed in the '252 patent would likely allow interference between the different frequency measurement systems when used in a multiple frequency resistivity tool.

A further limitation on using the converter disclosed in the '252 patent is that the disclosed converter does not eliminate the need for the narrow bandwidth analogbandpass filter provided at the input of the analog-to-digital converter. The limitations of using analog bandpass filters in the measuring circuit of a multiple frequency resistivity tool, as previously discussed, would still apply if the converter in the '252 patent were used in a resistivity tool.

It is an object of the present invention to provide a resistivity measuring tool having a plurality of fully digital measurement circuits, each circuit capable of operating at a different predetermined frequency, in order to provide minimum interference between individual measurement systems.

It is a further object of the present invention to provide a resistivity measuring tool having a plurality of monochromatic current sources each of which is fully digitally synthesized in order to minimize generation of spurious frequencies in the individual measure currents.

SUMMARY OF THE INVENTION

The present invention is a tool for measuring the resistivity of an earth formation comprising at least one measuring current source. The at least one source includes a sigma-delta modulator and a serial bit source corresponding to a digital representation of a predetermined measure current waveform. The present invention also comprises at least one measure current sensor coupled to a delta-sigma modulator and a digital filter which generates a digital output corresponding to an amplitude of said measure current at said at least one sensor.

In a preferred embodiment of the invention the tool comprises a measure current circuit in which a first measure current source generates a monochromatic sinusoidal signal having a first frequency and also comprises a first housing current circuit which operates at the first frequency. The tool of the preferred embodiment further comprises second and third measure current sources which generate monochromatic sinusoidal signals having second and third frequencies and second and third focusing current sources operating at the second and third frequencies. The preferred embodiment of the invention includes measure current sensors responsive to each measure current frequency.

DESCRIPTION OF THE PREFERRED EMBODIMENT

Figure 1:
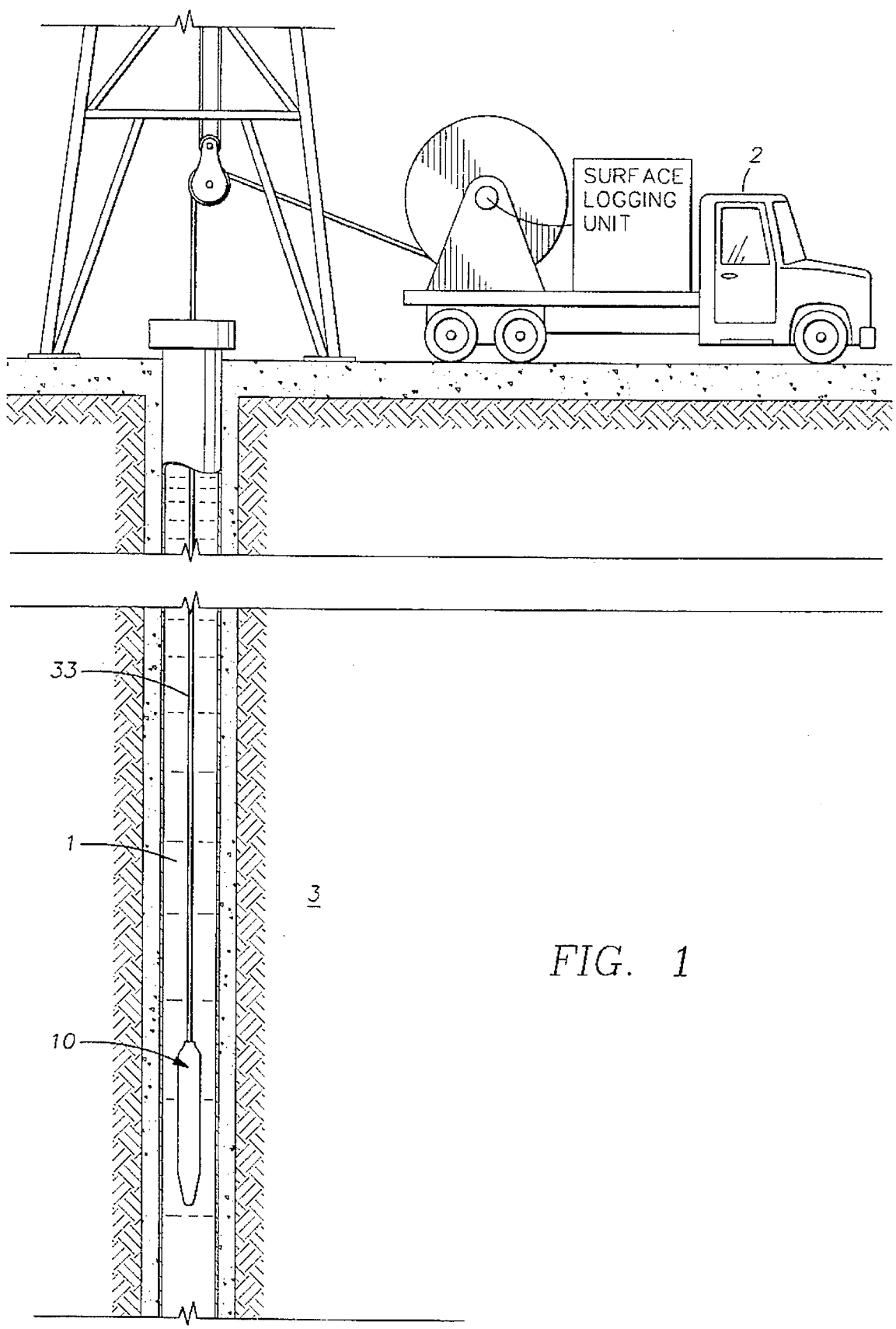
FIG. 1 shows the tool according to the present invention deployed in a borehole.

FIG. 1 shows a resistivity logging tool 10 as it is typically used in a borehole 1 penetrating an earth formation 3. The tool 10 is typically connected to one end of a cable 33 comprising at least one insulated electrical conductor (not shown). The cable 33 can be extended into the borehole 1 by means of a surface logging unit 2. The cable 33 carries electrical power from the surface unit 2 to the tool 10, and can transmit signals from the tool 10 to the surface unit 2. The surface unit 2 includes equipment (not shown separately) for receiving and interpreting signals transmitted by the tool 10. The surface unit also includes equipment (not shown separately) for transmitting control signals to the tool 10.

Figure 2:
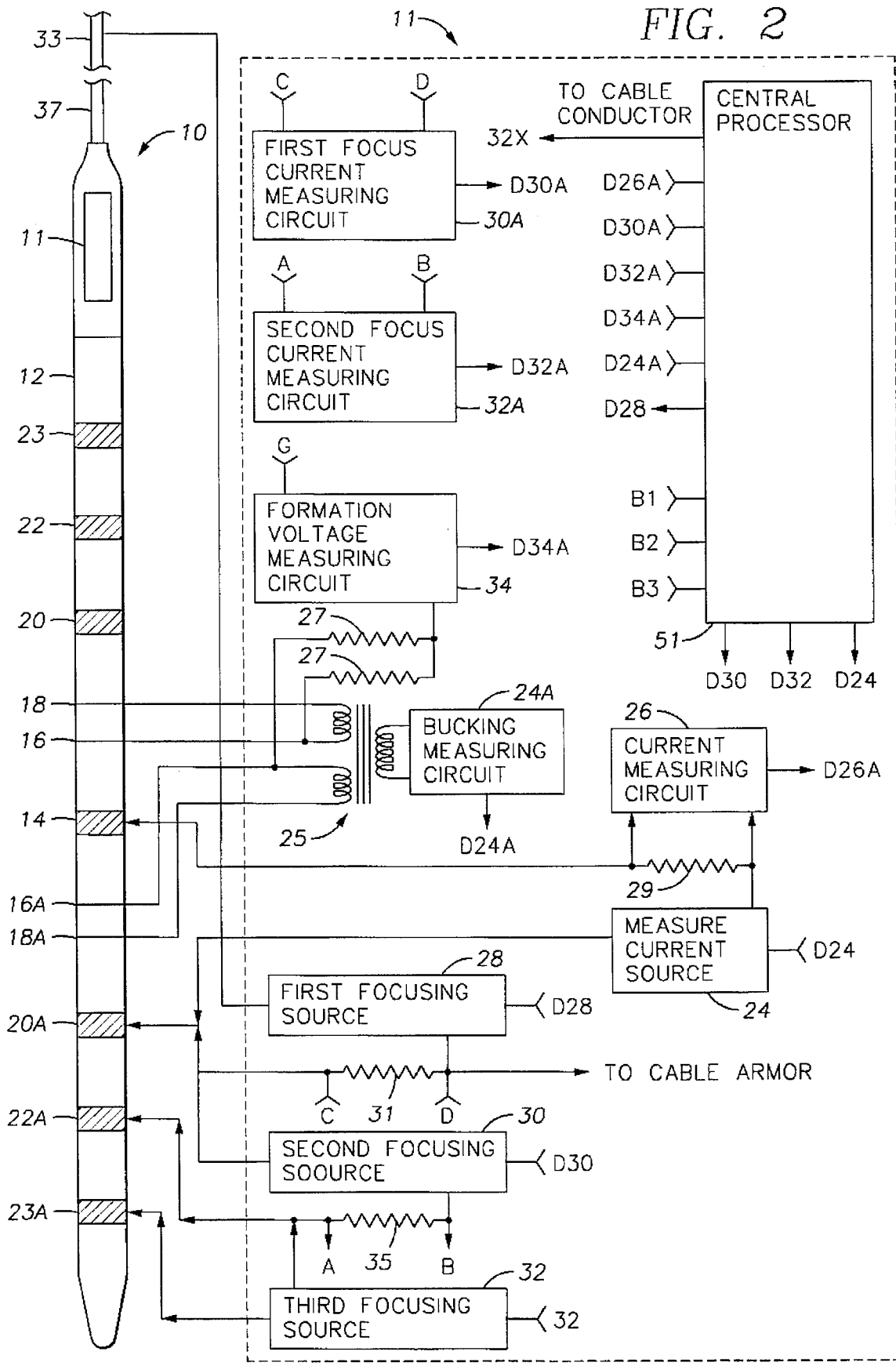
FIG. 2 shows a resistivity measuring tool according to the present invention.

FIG. 2 shows a functional diagram of the tool 10 according to the present invention. The tool 10 comprises a sonde 12 having a plurality of electrodes 14, 16, 16A, 18, 18A, 20, 20A, 22, 22A, 23, 23A disposed on an exterior insulating surface (not shown separately) of the sonde 12. The purposes of the individual electrodes will be further explained. The tool 10 also comprises various circuits, shown combined on a circuit assembly 11 disposed inside the sonde 12, which measure voltage drops of measuring currents passing through the earth formation 3. The purposes of the various circuits on the assembly 11 will be explained further. The measuring currents are introduced into the formation (shown as 3 in FIG. 1) adjacent to the borehole 1 by other circuits disposed on the assembly 11.

The circuit assembly 11 is shown in more detail in FIG. 2 as a functional block diagram including representative connections of the various circuits disposed on the assembly 11 to the different electrodes, as will be further explained.

The circuit assembly 11 comprises a formation voltage measuring circuit 34 connected at one input terminal to monitor electrodes 16 and 16A through a resistive divider 27, and at the other input terminal to a ground electrode G located at the earth's surface, the connection to the other input terminal being made through the conductor (not shown) in the cable 33. The formation voltage measuring circuit 34 measures a voltage occurring between the electrodes 16, 16A on the sonde 12 and the ground electrode G. The measurement of the voltage made by the formation voltage measuring circuit 34 is provided as a digital word at terminal D34A of the formation voltage measuring circuit 34. The voltage measured by the formation voltage measuring circuit 34 is related to resistivity of the earth formation 3 adjacent to the tool 10. The voltage measured by the measuring circuit 34 represents a potential difference resulting from a current of known magnitude flowing through the formation 3 between a source electrode 14 and electrodes 20 and 20A. The current of known magnitude is generated by a measure current source 24, as will be further explained. The digital word present at the terminal D34A can be conducted to a central processor 51, the operation of which will be further explained.

The formation voltage measuring circuit 34, which will be explained in greater detail, can be responsive to voltages at each of three different frequencies to enable substantially simultaneous measurement in three differently focused measure current systems. In the present embodiment, the frequencies of the measure current systems typically are 32, 128 and 512 Hz.

The measure current source 24, which in the present embodiment can include three, single-frequency monochromatic current sources each operating at one of the three previously described frequencies, is connected at one output terminal to the source electrode 14, and at the other output terminal to electrodes 20 and 20A (the symmetrical connection to electrode 20 is not shown in FIG. 2 for clarity of the illustration). The measure current source 24 provides the current with which the voltage drop through the earth formation 3 is measured by the formation voltage measuring circuit 34, as previously explained herein.

A bucking voltage measuring circuit 24A, responsive to the same three frequencies as the frequencies of the measure current source 24, is connected through a phase matched transformer 25 across pairs of monitor electrodes 16, 18; and 16A, 18A. The bucking voltage measuring circuit 24A measures a voltage drop between the monitor electrodes 16 and 18, and symmetrically about the source electrode 14 makes the same measurement between electrodes 16A and 18A. A digital word representing the voltage drop measured by the bucking voltage measuring circuit 24A is provided at terminal D24A on the bucking circuit 24A and is conducted to the central processor 51. If the voltage drop across the monitor electrodes 16, 18 (or symmetrically 16A, 18A) is non-zero, the processor 51 can be programmed to adjust the current output from the measure source 24 by changing the value of a digital control word conducted to terminal D24 on the source 24 from the processor 51. The means by which the processor 51 adjusts the output of the source 24 will be further explained. By adjusting the current output from the current source 24 to maintain substantially zero voltage drop between the monitor electrodes 16, 18 and 16A, 18A, the processor 51 substantially maintains a predetermined focusing pattern of the measuring current near the wellbore 1. Because the measure current is substantially maintained within the predetermined focusing pattern, the voltage drop measured by the formation voltage measuring circuit 34 can be more directly related to resistivity of the formation 3. It is known in the art to provide a single analog circuit which provides the same function as the combined operation of the bucking measuring circuit 24, the measure current source 24 and the measure current adjustment feature of the processor 51, however the present embodiment is directed to a fully digital resistivity tool.

The magnitude of the measure current generated by the measure source 24 is itself measured by a current measuring circuit 26 which is responsive to each of the same three measurement frequencies as is the formation voltage measuring circuit 34. The current measuring circuit 26 comprises a voltage measuring circuit (which will be explained in more detail), of substantially the same design as the formation voltage measuring circuit 34, connected across a shunt resistor 29 interposed in the measure current path between the electrode 14 and the measure current source 24. Current flowing across the shunt resistor 29 generates a voltage drop proportional to the current flow across the shunt resistor 29. The voltage measured across the shunt resistor 29 therefore is proportional to the magnitude of the measure current generated by the measure current source 24. The measurement made by the second measuring circuit 26 is provided as a digital word on terminal D26A which is conducted to the processor 51. The measurement made by the second measuring circuit 26 which is proportional to current magnitude can be combined with the voltage drop measurement made by the formation voltage measuring circuit 34 to determine the resistivity of the earth formation 3.

Three focus current sources 28, 30 and 32, each operating at a different one of the three previously described measurement system frequencies, are connected symmetrically about the source electrode 14 to focusing electrodes 20 and 20A; 22 and 22A; and 23 and 23A, these electrodes being disposed on the sonde 12 at axially spaced apart locations from the source electrode 14. Each of the focus current sources 28, 30, 32 is connected to the electrodes in a different configuration so as to cause focusing current from each source to flow in a different path. Each of the three different frequency measuring currents corresponding to one of the focusing currents can therefore constrained to a different predetermined focusing pattern in the borehole 1 and the earth formation 3 adjacent to the borehole 1. For example, a first focusing source 28, which operates at a first frequency, is connected at one output to all three focusing electrodes 20, 22, and 23, and symmetrically about the source electrode 14 to electrodes 20A, 22A and 23A (although the symmetric connections are not shown in FIG. 2 for clarity of illustration). The other output of the first focusing source 28 is connected to the cable 33 armor. The first focusing source 28 provides focusing to the measuring current having the greatest radial depth of constraint because the focusing current from the first source 28 is constrained to flow substantially entirely radially outward from the sonde 12 before dispersing in the earth formation 3 and returning to the cable 33 armor.

A second focusing source 30, operating at a second frequency, is typically connected across electrodes 20 and 22 (and symmetrically 20A and 22A, but the symmetrical connections again are not shown for clarity) to provide focusing to the second frequency measure current having a reduced radial depth of constraint relative to the first frequency measuring current focused by the first focusing source 28. The focusing pattern of the second focusing source 30 enables dispersion of the measuring current in the formation 3 at a shallower radial distance from the sonde 12 than does the first focusing source 28 pattern, because the second focusing current is returned to the electrodes 22, 22A on the sonde rather than on the cable 33 armor. Returning the focusing current to the electrodes 22, 22A enables dispersion of the second frequency measure current radially closer to the sonde 12, so that a relatively shallower radial measurement of formation resistivity can be made by the second than can be made by the first measure current.

A third focusing source 32, operating at a third frequency, can be connected between electrodes 22 and 23 (and symmetrically to 22A and 23A with symmetrical connections again not shown for clarity of illustration) to provide even shallower radial constraint of the third frequency measuring current than the second focusing source 30 does for the second frequency measuring current. The shallower radial constraint of the measuring current provided by the third focusing source 32 results from the focusing electrodes 22, 23 and 22A, 23A being spaced at a greater axial distance from the source electrode 14 than the focusing electrodes 20, 22 (and symmetrically, 20A, 22A) used for emitting the focusing current at the second frequency. The longer axial spacing of the electrodes 22, 23 used for the third frequency focusing current enables the third frequency measuring current to disperse in the earth formation 3 at an even shallower radial distance from the sonde 12 than does the second frequency measuring current.

Output levels of the focus sources 28, 30, 32 can be controlled by digital words input to terminals D28, D30 and D32, respectively, from the processor 51.

Focusing current measuring circuits 30A and 32A can be connected across shunt resistors 31 and 35, respectively, to provide measurement of the total amount of focus current generated by the first source 28, and the second and third sources 30, 32, respectively. Focusing current measurements are provided as digital words on terminals D30A and D32A, respectively, and are conducted to the processor 51. As will be further explained, focusing current magnitudes can be adjusted in response to different values of formation 3 resistivity so as to control the dynamic range of signal at the input of the formation voltage measuring circuit 34 and the current measuring circuit 26.

Figure 3:
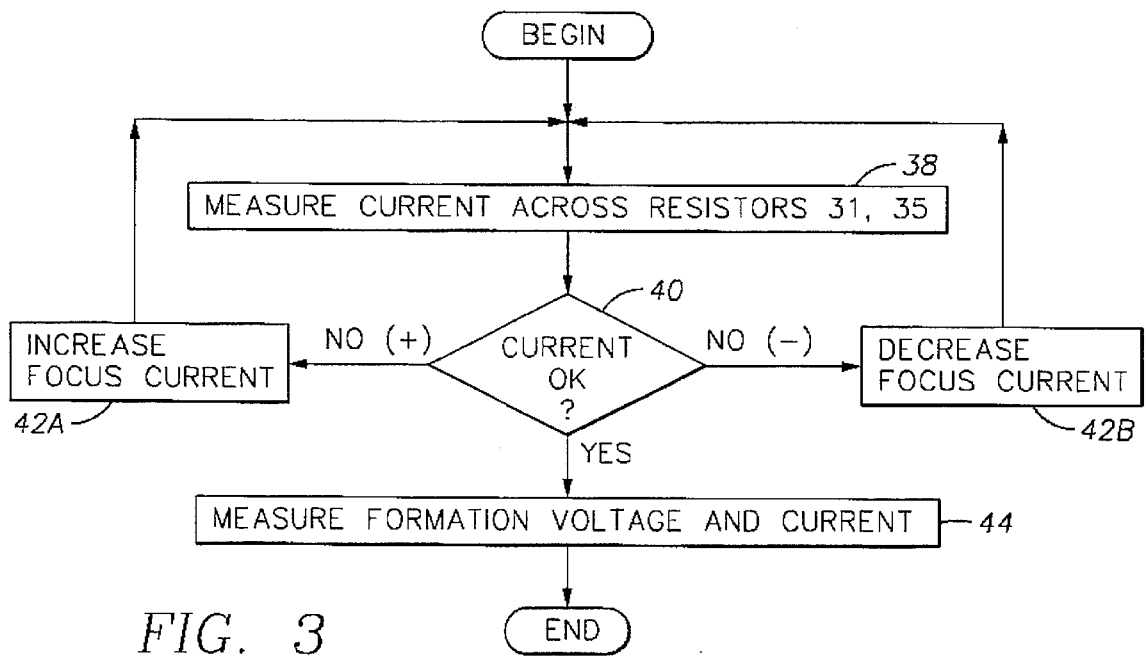
FIG. 3 shows a system for adjusting the amount of focusing current.

FIG. 3 shows a flow chart of a typical measurement sequence provided by the tool (shown as 10 in FIG. 1 ). The focusing currents are measured by circuits 30A and 32A, as generally shown at 38. If the currents from the sources 28, 30, 32 are determined to be too low or too high to maintain a minimum predetermined signal level at the inputs of the formation voltage measuring circuit 34 and the current measuring circuit 26 as shown at number 40, adjustments are made under control of the processor 51 to the output levels of the focus current sources 28, 30 and 32 either to increase as shown at 42A, or to decrease as shown at 42B, the level of the focus currents. The means by which the processor 51 changes the output level of the sources 28, 30, 32 will be further explained. Changes in the amount of required focus current can occur, for example, if the fluid filling the borehole 1 is particularly conductive or resistive, or the earth formation 3 is particularly conductive or resistive. When the focus currents are determined to be of the correct magnitude, voltage drop and current magnitude of the measure currents are made, as shown generally at 44.

Figure 4:
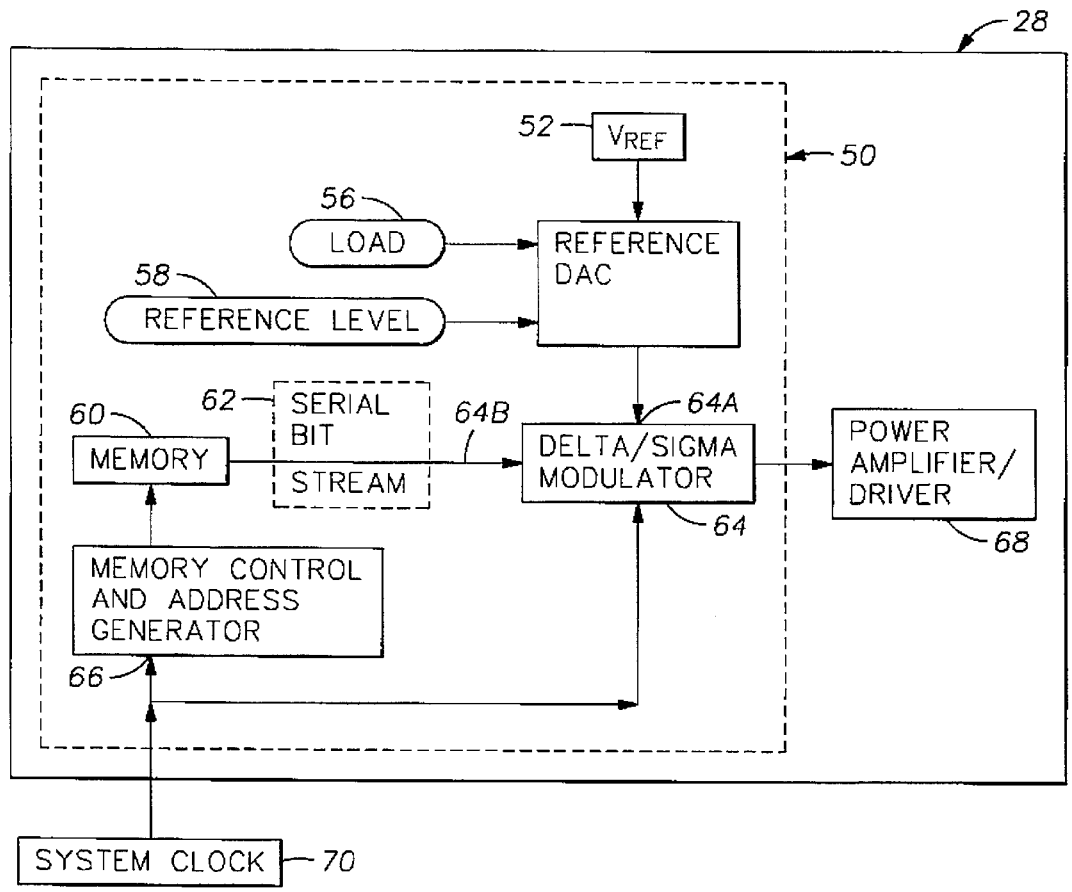
FIG. 4 shows a measuring signal generator according to the present invention.

The current sources according to the present invention can be better understood by referring to FIG. 4. The source, shown as 28 in FIG. 4, can also correspond to any of the other sources shown in FIG. 2 such as the focus current sources 28, 30 and 32, or the measure current source 24.

The output magnitude of the source 28 is controlled by a reference level digital word conducted to an input terminal 58 of a reference digital to analog converter (DAC) 54 forming part of the source 28. The input terminal 58 of the reference DAC 54 shown in FIG. 4 corresponds to any one of the digital word input terminals D24, D28, D30 or D32 of the sources 24, 28, 30 or 32, respectively, shown in FIG. 2. The input terminal 58 is connected to the corresponding terminal on the processor 51. The digital word present at the input terminal 58 is loaded into the reference DAC 54 when a load command is applied to a command terminal 56 on the reference DAC 54 by the processor 51. A load command is generated by the processor 51 when the processor 51 calculates that the value of the digital word is to be changed. As previously explained, the value of the digital word can be changed by the processor 51 in response to measurements provided by the focus measuring circuits 30A, 32A, and the formation voltage 34 and current measuring 26 circuits.

The reference DAC 54 is connected to a precision voltage reference source 52. The precision voltage reference source 52 generates a substantially constant voltage direct current (DC). The substantially constant voltage DC from the reference source 52 maintains accuracy and repeatability of conversion of the digital word present at the input terminal into an output level control signal by the reference DAC 54.

The output of the reference DAC 54 typically is a substantially constant voltage DC which is conducted to a delta-sigma modulation 64 at a reference input terminal 64A. As previously explained, the magnitude of the DC voltage output from the reference DAC 54 is determined by the reference digital word conducted to the input terminal 58.

A serial bit stream 62 is generated by a memory control and address generator 66 sequentially activating a digital memory 60. The serial bit stream 62 is connected to a digital input terminal 64B on the modulator 64. The serial bit stream 62 contains a series of numbers corresponding in magnitude to the instantaneous output magnitude of the source 28 at spaced apart time intervals. In the present invention the waveform is typically sinusoidal. The serial bit stream 62 therefore determines the waveform shape and frequency about the frequency of the current output from the source 28. In the present embodiment the frequency typically is 32, 128 or 512 Hz. The output from the modulator 64 is conducted to a circuit which can be a power amplifier or a source electrode driver as shown at 68, and thence to electrodes such as the focusing electrodes shown as 22 and 22A in FIG. 2.

The output of the modulator 64 comprises analog signals proportional in magnitude to the magnitude of the reference voltage conducted from the reference DAC 54. The modulator 64 generates output samples at a rate which is determined by the frequency of a system clock 70 connected to the modulator 64. The clock 70 frequency is much higher than the output frequency of the source 28. In the present embodiment the system clock 70 frequency typically is 1.024 MHz. The high frequency samples from the modulator 64 are filtered into the correct output waveform in a low-pass filter forming part of the amplifier 68. Because the output frequency of the samples generated by the modulator 64 is much higher than the operating frequency of the current source 28, the filter components which form part of the amplifier 68 can have cut-off frequencies well above the operating frequency of the source 28. In the present embodiment, the filter forming part of the amplifier 68, can have a cut-off frequency of 256 KHz, which is one-fourth the frequency of the system clock 70, but is 500 times the highest operating frequency of the source 28 (which is 512 Hz). The filter components forming part of the amplifier 68 can therefore be designed to have gradual "roll-off" characteristics, which greatly simplifies the design of the filter components.

In the present embodiment of the invention, the source 28 can comprise an integrated module, shown as 50 in FIG. 4, including the voltage reference 52, the reference DAC 54, the modulator 64, the memory 60, and the memory controller 66. The module 50 can be programmed, by insertion of appropriate bit stream data into the memory 60 during construction or servicing of the module 50, to generate a predetermined signal. In the present embodiment of the invention the predetermined signal can be a monochromatic sinusoid having a frequency of 32, 128 or 512 Hz.

The processor 51 can be programmed to respond to inputs, provided as digital words to input terminals D26, D30A, D32A, and D34A on the processor 51, from the measuring circuits 26, 30A, 32A and 34, respectively. Signals representing resistivity of the formation 3, which are generated in the processor 51 in response to measurements generated by the formation voltage 34 and second 26 measuring circuits, as previously explained, can be transmitted to the cable 33 in the form of digital words conducted from terminal 32X on the processor 51.

Figure 5:
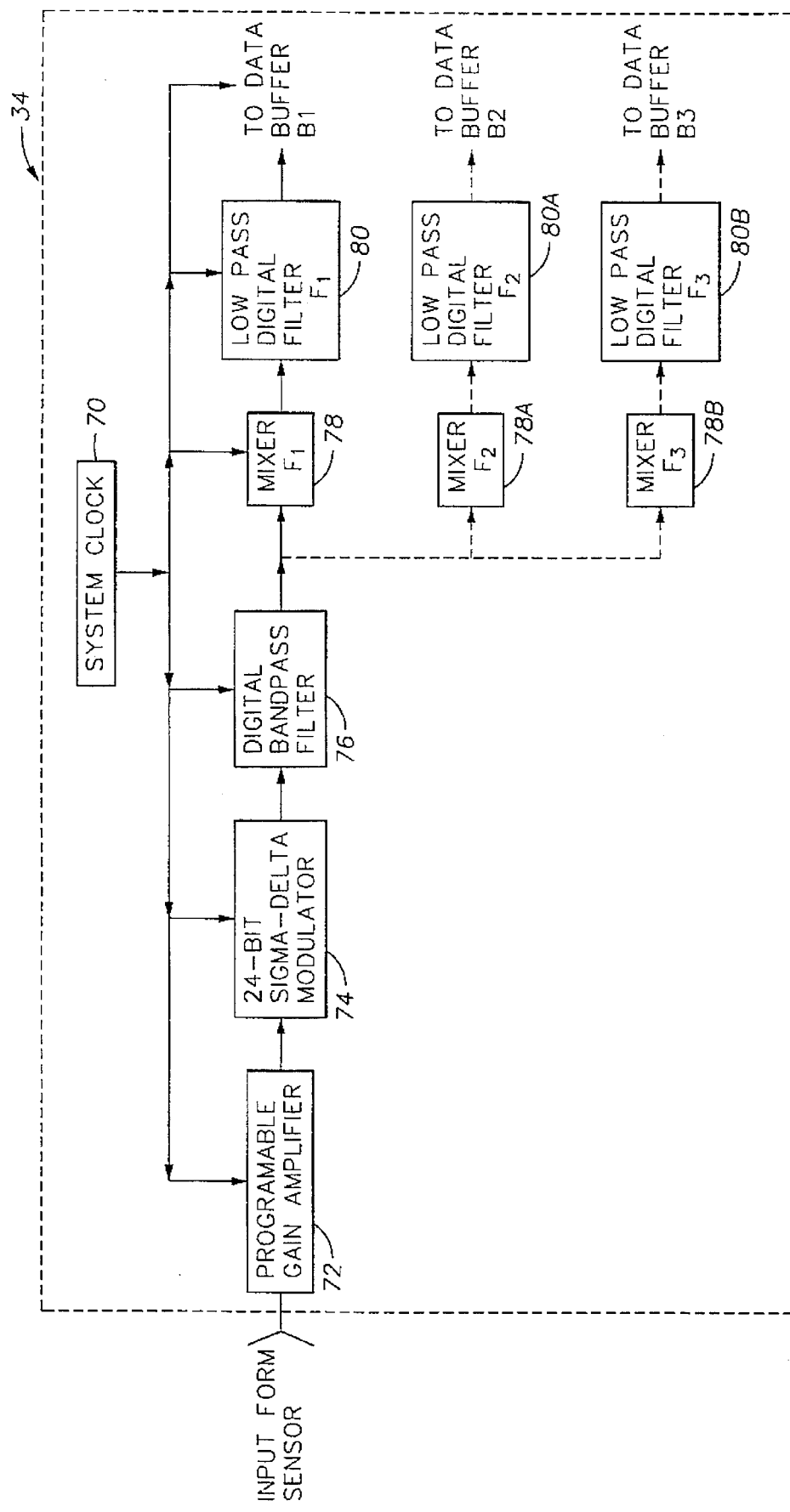
FIG. 5 shows a voltage measuring circuit according to the present invention.

Referring now to FIG. 5, the voltage measuring circuit 34 according to the present invention will be explained in more detail. An analog signal input from a sensor, which in the present embodiment can be one or more of the electrodes on the tool 10, is conducted to a programmable gain amplifier (PGA) 72. The PGA 72 can be controlled by the central processor 51 so as to maintain an output signal level which remains within the resolution range of a sigma-delta modulator 74, to which the output of the PGA 72 is conducted.

The modulator 74 converts the signal from the PGA 72 into a serial bit stream at a rate determined by the frequency of the system clock 70, to which the modulator 74 is operatively connected. The serial bit stream output of the modulator represents the magnitude of the signal input from the PGA 72 sampled at spaced apart time intervals. The serial bit stream is composed essentially of digital "ones" and "zeroes" having individual durations proportional to the cycle time of the system clock 70. The serial bit stream has a quantity of digital "ones" in any period of time composed of a plurality of clock 70 cycles, which is proportional to the magnitude of the analog signal conducted to the sigma-delta modulator 74.

The output of the modulator 74 is conducted to a digital bandpass filter 76. The digital bandpass filter 76, among other things, removes high frequency components of the output of the modulator 74 which are introduced into the signal as a result digitization of the signal in the modulator 74. Some of the high frequency components in the output of the modulator 74 are referred to as "quantization noise".

The output of the filter 76 can be resampled into a parallel digital output by processing in a mixer 78. The parallel digital output of the mixer 78 comprises multiple-bit binary digital words representing the magnitude of the analog signal entering the measuring circuit 34 sampled at spaced-apart time intervals.

The mixer 78 is adapted to resample the serial bit stream conducted from the filter 76 at a lower frequency than the frequency of the clock 70. The output of the mixer 78 is conducted to a digital low-pass filter. The digital low-pass filter 80 attenuates signal components above the frequency of the particular measure current being detected. The parallel digital output from the mixer 78 is generated at a predetermined sample rate, which preferably is at least four times the particular frequency being detected, to prevent aliasing of the output being processed in the low-pass filter 80.

Alternatively, the voltage measuring circuit 34 can be responsive to a plurality of frequencies by addition of other mixers 78A, 78B and digital low-pass filters 80A, 80B, each mixer and filter pair being responsive to a different frequency. In the present embodiment of the invention, the measuring circuit 34 comprises three mixers 78, 78A, 78B and three digital low pass filters 80, 80A, 80B so as to be responsive to the three operating frequencies of the tool 10, which typically are 32, 128 and 512 Hz. The outputs of the filters 80, 80A, 80B comprise digital words representing magnitudes of voltages at each of the three different frequencies measured by the formation voltage measuring circuit 34 sampled at spaced-apart time intervals.

In the present embodiment of the invention, the functions of the modulator 74 and the mixer 78 can be combined into a single module comprising, for example, an analog-to-digital converter made by Chesapeake Sciences Corp. and sold under model designation dsm-501, and a serial programmable digital filter made by Harris Semiconductor Corp. and sold under model designation HSP43214.

Output of the digital low pass filter 80, 80A, 80B can be directed to buffers B1, B2, B3 forming part of the central processor (shown as 51 in FIG. 2) where the digital words representing the voltage measurements can be stored until the measurements are required to be used by the processor 51, or are to be transmitted to the surface unit 2.

While the present embodiment of the invention is directed to a galvanic resistivity tool having three operating frequencies, it is contemplated that the present invention could also comprise a galvanic resistivity tool having four or more operating frequencies and current measuring systems to enable, for example, azimuthally sensitive resistivity measurements.

DESCRIPTION OF AN ALTERNATIVE EMBODIMENT

Figure 6:
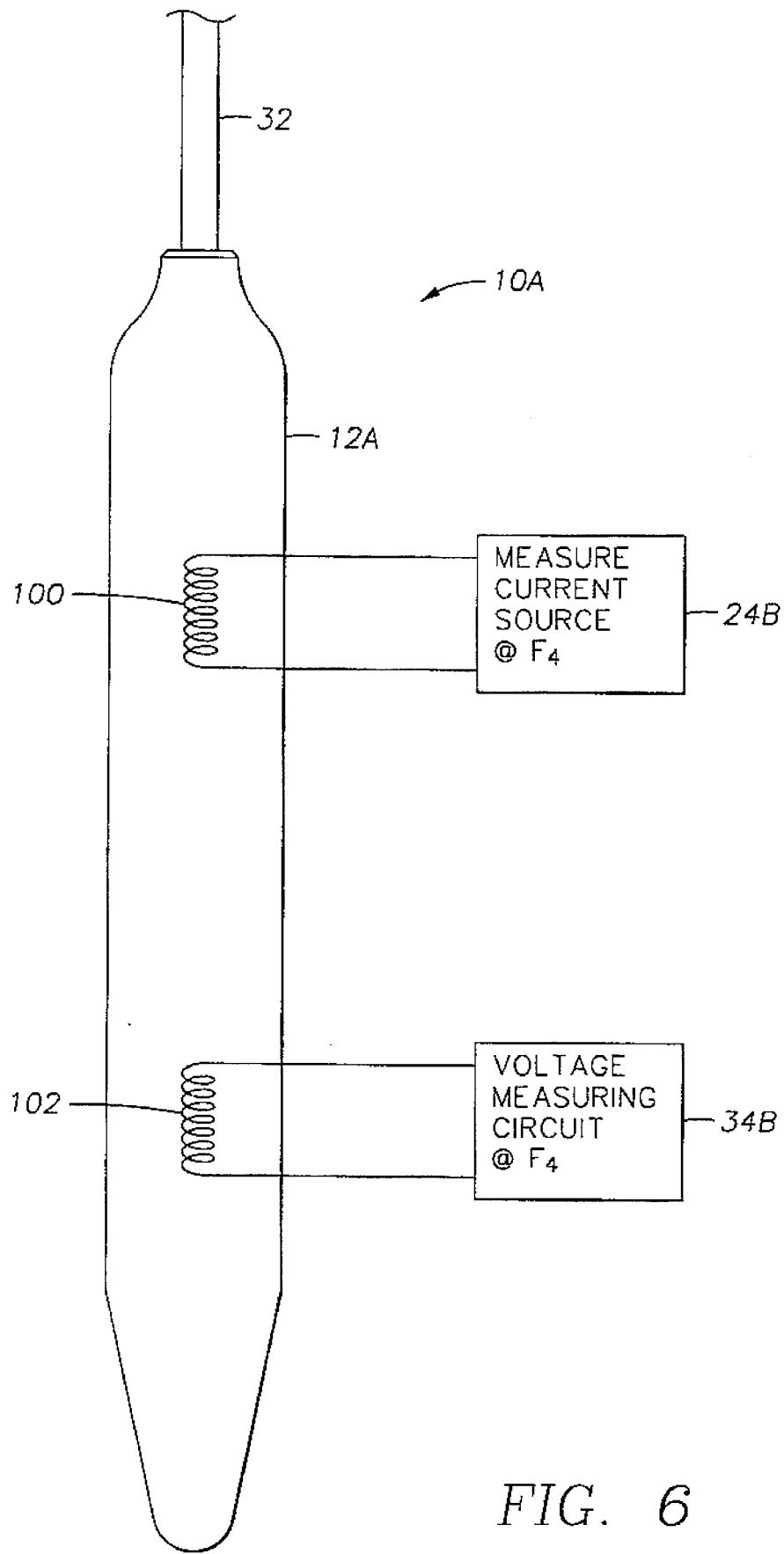
FIG. 6 shows an alternative embodiment of a resistivity measuring tool.

An alternative resistivity measuring tool 10A comprising a measuring circuit and a current source according to the present invention is shown in FIG. 6. The resistivity tool 10A in FIG. 6 is an induction measuring device comprising a transmitter coil 100 disposed within a sonde 12A similar to the sonde 12 in FIG. 2. The transmitter coil 100 is connected to a measure current source 24B which can be substantially the same type as the source shown in detail as 24 in FIG. 4. Current flows in the transmitter coil 100 and induces eddy currents in the earth formation 3 which flow substantially coaxially around the tool 10A. The eddy currents in the formation 3 themselves induce voltages in a receiver coil 102 disposed within the sonde 12A at an axially spaced apart location from the transmitter coil 100. The magnitude of the voltages induced in the receiver coil 102 is related to the resistivity of the earth formation 3. A voltage measuring circuit 34B which can be substantially the same type as the circuit shown as 34 in FIG. 2 is connected to the receiver coil 102 to measure the magnitude of the voltages induced in the receiver coil 102. Measurements made by the voltage measuring circuit 34B can be transmitted to the surface unit 2 for interpretation.

The induction tool 10A typically operates at a much higher frequency than the laterolog tool (shown as 10 in FIG. 2), because the magnitude of the voltages induced in the receiver coils 102 is generally proportional to the frequency of the current in the transmitter coil 100. The frequency in the present embodiment can be within a range from 10 kHz to about 150 kHz. The source 24B and the measuring circuit 34B can be programmed to generate and receive, respectively, any of the individual frequencies used in the induction tool 10A by appropriate selection of mixers (shown as 78 in FIG. 5) and digital filters (shown as 80 in FIG. 5) for the measuring circuit 34B, and by appropriately programming the memory 60 in the source 24B to generate a serial bit stream representative of a 10–150 kHz sinusoidal signal.

The tool 10A shown in FIG. 6 is shown as having only one transmitter coil 100 and one receiver coil 102. For reasons well known in the art, a practical induction logging tool 10A can have a plurality of receiver coils (not shown) and transmitter coils (not shown) disposed within the sonde 12A at different axially spaced apart locations. Each of the plurality of coils can be responsive to a different frequency. The tool 10 shown in FIG. 2 and the tool 10A shown in FIG. 6 are not intended to be exclusive representations of the invention described herein. The scope of the invention should be limited only by the claims appended hereto.

What is claimed is:

1. An apparatus for measuring resistivity of an earth formation penetrated by a borehole, comprising:

a sonde adapted to traverse said borehole;

at least one source of measuring current including a delta-sigma modulator and a serial bit source coupled to said modulator, said bit source providing a digital representation of a magnitude of said measuring current sampled at spaced apart time intervals, said source of measuring current coupled to an emitter disposed on said sonde;

at least one sensor disposed on said sonde, said sensor generating a signal in response to formation current resulting from interaction of said measuring current with said earth formation; and a sigma-delta modulator coupled to said at least one sensor, said modulator coupled to a digital mixer, said digital mixer coupled to a digital filter, an output of said filter comprising digital words corresponding to amplitude of said signal generated by said at least one sensor, said words sampled at spaced apart time intervals.

2. The apparatus as defined in claim 1 further comprising a plurality of said sources of measuring current electrically coupled to said emitter, each one of said sources generating a substantially monochromatic sinusoidal signal at a frequency different from the frequency of the other ones of said sources of measuring current.

3. The apparatus as defined in claim 2 further comprising a plurality of sensors, each one of said sensors coupled to a sigma-delta modulator and a digital filter responsive to a different one of said frequencies of said sources of measuring current so that magnitudes of signal generated by each one of said sensors in response to formation current resulting from interaction of said formation with each one of said measuring current at each of said frequencies can be determined.

4. The apparatus as defined in claim 3 wherein said emitter comprises electrodes disposed on said sonde at axially spaced apart locations.

5. The apparatus as defined in claim 3 wherein said plurality of sensors comprises second electrodes disposed on said sonde.

6. The apparatus as defined in claim 1 wherein said emitter comprises an induction transmitter coil.

7. The apparatus as defined in claim 1 wherein said sensor comprises an induction receiver coil.

8. The apparatus as defined in claim 1 further comprising: a digital mixer coupled to an output of said digital filter; and a digital low-pass filter coupled to an output of said digital mixer, said low-pass filter having a cut-off frequency corresponding to an output of said mixer, said digital mixer cooperative with said modulator and said digital filter to generate a digital output corresponding to a magnitude of said frequency of each one of said measuring current.

9. The apparatus as defined in claim 2 further comprising: a plurality of digital mixers coupled to said digital filter, each of said mixers having a different output frequency; and a plurality of digital low-pass filters, each of said digital low-pass filters coupled to an output of one of said plurality of mixers, each of said low pass filters having a different cut-off frequency corresponding to said output frequency of one of said plurality of digital mixers, each one of said digital mixers cooperative with said modulator and said digital filter to generate a digital output corresponding to a magnitude of said signal at a different corresponding one of said frequencies of said sources of measuring current.

10. The apparatus as defined in claim 1 wherein said emitter comprises an electrode.

11. An apparatus for measuring resistivity of an earth formation penetrated by a borehole, comprising:

a sonde adapted to traverse said borehole;

at least one source of measuring current including a modulator and a serial bit source coupled to said modulator, said bit source providing a digital representation of a magnitude of said measuring current sampled at spaced apart time intervals, said source of measuring current coupled to an emitter disposed on said sonde;

at least one sensor disposed on said sonde, said sensor generating a signal in response to a current resulting from interaction of said measuring current with said earth formation; and means for measuring a magnitude of said signal coupled to said at least one sensor, said means for measuring including a sigma-delta modulator coupled to said sensor; a digital mixer coupled to said sigma-delta modulator and a digital filter coupled to said mixer.

12. The apparatus as defined in claim 11 further comprising a plurality of said sources of measuring current electrically coupled to said emitter, each one of said sources generating a substantially monochromatic sinusoidal signal at a different frequency from the other ones of said sources.

13. The apparatus as defined in claim 12 wherein said emitter comprises electrodes disposed on said sonde at axially spaced apart locations.

14. The apparatus as defined in claim 11 wherein said emitter comprises an induction transmitter coil.

15. The apparatus as defined in claim 11 wherein said sensor comprises an induction receiver coil.

16. An apparatus for measuring resistivity of an earth formation penetrated by a borehole, comprising:

a sonde adapted to traverse said borehole;

at least one source of measuring current coupled to an emitter disposed on said sonde, said source comprising a substantially monochromatic sinusoidal alternating current, said source including a delta-sigma modulator and a delta-sigma modulator and a serial bit source coupled to said modulator, said bit source providing a digital representation of a magnitude of said measuring current sampled at spaced apart time intervals, said source of measuring current coupled to an emitter disposed on said sonde;

at least one sensor disposed on said sonde, said sensor generating a signal in response to a current resulting from interaction of said measuring current with said formation; and a sigma-delta modulator coupled to said at least one sensor, an output of said modulator coupled to a digital mixer, an output of said mixer coupled to a digital filter, an output of said filter comprising digital words corresponding to amplitude of said signal sampled at spaced apart time intervals.

17. The apparatus as defined in claim 16 further comprising: a digital mixer coupled to an output of said digital filter; and a digital low-pass filter coupled to an output of said digital mixer, said low-pass filter having a cut-off frequency corresponding to an output frequency of said mixer, said digital mixer cooperative with said modulator and said digital filter to generate a digital output corresponding to a magnitude of said signal at a frequency of said measuring current.

18. An apparatus for measuring resistivity of an earth formation penetrated by a borehole, comprising:

a sonde adapted to traverse said borehole;

at least one source of measuring current including a delta-sigma modulator and a serial bit source coupled to said modulator, said bit source providing a digital representation of a magnitude of said measuring current sampled at spaced apart time intervals, said source of measuring current coupled to source electrodes disposed on said sonde;

sensor electrodes disposed on said sonde, said sensor electrodes responsive to formation current resulting from interaction of said measure current with said earth formation; and a sigma-delta modulator coupled to said sensor electrodes, said sigma-delta modulator coupled to a digital mixer, said mixer coupled to a digital filter, an output of said filter comprising digital words corresponding to amplitude of formation current detected by said sensor electrodes, said words sampled at spaced apart time intervals.

19. The apparatus as defined in claim 18 further comprising:

a plurality of said sources of measuring current electrically coupled to said source electrodes, each one of said sources generating a substantially monochromatic sinusoidal signal at a frequency different from the frequency of the other ones of said sources of measuring current; and a plurality of digital mixers coupled to said sigma delta modulator, each of said mixers adapted to demodulate a frequency of one of said plurality of sources.

20. An apparatus for measuring resistivity of an earth formation penetrated by a borehole, comprising:

a sonde adapted to traverse said borehole;

at least one source of measuring current including a delta-sigma modulator and a serial bit source coupled to said modulator, said bit source providing a digital representation of a magnitude of said measuring current sampled at spaced apart time intervals, said source of measuring current coupled to an induction transmitter disposed on said sonde;

an induction receiver disposed on said sonde, said receiver responsive to current resulting from interaction of said measure current with said earth formation; and a sigma-delta modulator coupled to said induction receiver, said sigma-delta modulator coupled to a digital mixer, said mixer coupled to a digital filter, an output of said filter comprising digital words corresponding to amplitude of electrical voltage detected by said induction receiver, said words sampled at spaced apart time intervals.

21. The apparatus as defined in claim 20 further comprising:

a plurality of said sources of measuring current electrically coupled to induction transmitter, each one of said sources generating a substantially monochromatic sinusoidal signal at a different frequency from the other ones of said sources; and a plurality of digital mixers coupled to said sigma-delta modulator, each of said mixers adapted to demodulate a frequency of one of said plurality of sources.

* * * * *